(12) United States Patent
Kotzor et al.

(10) Patent No.: US 9,223,006 B2
(45) Date of Patent: Dec. 29, 2015

(54) METHOD AND DEVICE FOR LOCALIZING OBJECTS

(75) Inventors: Daniel Kotzor, Seefeld (DE); Wolfgang Utschick, Ingolstadt (DE)

(73) Assignee: EADS DEUTSCHLAND GmbH, Ottobrunn (DE)

( * ) Notice: Subject to any disclaimer, the term of this patent is extended or adjusted under 35 U.S.C. 154(b) by 1181 days.

(21) Appl. No.: 13/147,959

(22) PCT Filed: Feb. 5, 2010

(86) PCT No.: PCT/EP2010/051408
§ 371 (c)(1),
(2), (4) Date: Nov. 16, 2011

(87) PCT Pub. No.: WO2010/089365
PCT Pub. Date: Aug. 12, 2010

(65) Prior Publication Data
US 2012/0059621 A1     Mar. 8, 2012

(30) Foreign Application Priority Data

Feb. 5, 2009   (DE) .......................... 10 2009 007 684

(51) Int. Cl.
| | |
|---|---|
| *G01D 21/00* | (2006.01) |
| *G01S 5/14* | (2006.01) |
| *G01B 21/16* | (2006.01) |
| *G06F 17/40* | (2006.01) |
| *G06F 19/00* | (2011.01) |
| *G01S 5/02* | (2010.01) |
| *G06K 9/00* | (2006.01) |

(52) U.S. Cl.
CPC ............... *G01S 5/0294* (2013.01); *G01B 21/16* (2013.01); *G01D 21/00* (2013.01); *G01S 5/0278* (2013.01); *G01S 5/14* (2013.01); *G06K 9/00664* (2013.01); *G06F 17/40* (2013.01); *G06F 19/00* (2013.01)

(58) Field of Classification Search
CPC ............ G01B 7/00; G01B 7/14; G01B 11/00; G01B 11/15; G01B 15/00; G01B 17/00; G01B 21/00; G01B 21/16; G01C 3/00; G01C 3/02; G01C 3/06; G01C 3/08; G01C 3/085; G01C 21/00; G01C 21/04; G01C 22/00; G01D 7/00; G01D 9/00; G01D 21/00; G01P 13/00; G01S 5/00; G01S 5/02; G01S 5/0278; G01S 5/0284; G01S 5/14; G01S 15/16; G01S 5/18; G01S 5/30; G01S 11/00; G01S 11/02; G01S 11/12; G01S 11/14; G01S 13/00; G01S 13/02; G01S 13/06; G01S 13/08; G01S 13/50; G01S 13/58; G01S 13/588; G01S 13/62; G01S 15/00; G01S 15/02; G01S 15/06; G01S 15/08; G01S 15/50; G01S 15/58; G01S 15/588; G01S 15/62; G01S 17/00; G01S 17/02; G01S 17/06; G01S 17/08; G01S 17/50; G01S 17/58; G05D 1/00; G06F 11/00; G06F 11/30; G06F 11/03; G06F 11/02; G06F 11/34; G06F 15/00; G06F 15/16; G06F 17/00; G06F 17/10; G06F 17/40; G06F 19/00; G06K 9/00; G06K 9/00642; G06K 9/00664
USPC ........ 33/1 R, 1 M, 501, 506; 73/432.1, 865.8, 73/865.9, 866.3; 181/125; 250/200, 206, 250/206.1, 206.2; 342/118, 126, 146; 356/3, 3.01, 4.01, 5.01, 614, 615, 622, 356/623; 367/87, 99, 118, 127, 128, 129; 382/100, 103, 106, 107; 702/1, 127, 702/150, 155, 158, 159, 187, 189; 708/100, 708/105, 200

See application file for complete search history.

(56) References Cited

U.S. PATENT DOCUMENTS

| | | | | |
|---|---|---|---|---|
| 3,075,190 | A * | 1/1963 | Laporte | .......................... 342/146 |
| 3,445,847 | A * | 5/1969 | Hammack | ...................... 342/465 |
| 3,795,911 | A * | 3/1974 | Hammack | ...................... 342/106 |

OTHER PUBLICATIONS

International Search Report of corresponding International Application No. PCT/EP2010/051408, dated Jun. 8, 2010.

Written Opinion of the International Search Authority of corresponding International Application No. PCT/EP/051408, dated Jun. 8, 2010.
The Office Action of the corresponding German Patent Application No. 10 2009 007 684.0-55, dated Oct. 29, 2009.
Pan, J.J. et al.: A Manifold Regularization Approach to Calibration Reduction for Sensor-Network based Tracking; American Association for Artificial Intelligence; 2006; p. 988-993.
B. Scholkopf and A. Smola: Learning with Kernels; Massachusetts Institute of Technology; 2000.
C. Taylor, A. Rahimi, J. Bacharach, H. Shrobe and A. Grue: Simultaneous Localization, Calibration, and Tracking in an ad Hoc Sensor Network; Computer Science and Artificial Intelligence Laboratory Massachusetts Institute of Technology Apr. 19-21, 2006; p. 27-33.
E. Olson, J. Leonard and S. Teller; Robust Range-Only Beacon Localization; IEEE Journal of Ocean Engineering. vol. 31. No. 4; Oct. 2006; p. 949-958.
P. Newman, and J. Leonard; Pure Range-Only Sub-Sea SLAM; 2003 IEEE International Conference on Robotics & Automation; Taipei, Taiwan; Sep. 14-19, 2003; p. 1921-1926.
Hollinger G. et al.; Tracking a Moving Target in Cluttered Environments with Ranging Radios; 2008 IEEE International Conference on Robotics & Automation; Pasadena, CA, USA; May 19-23, 2008; p. 1430-1435.
J-L Blanco et al.; A Pure Probabilistic Approach to Range-only SLAM; 2008 IEEE International Conference on Robotics & Automation; Pasadena, CA, USA; May 19-23, 2008; p. 1436-1441.
Xuanlong Nguyen et al.; A Kernel-Based Learning Approach to Ad Hoc Sensor Network Localization; ACM Transactions on Sensor Networks, vol. 1, Aug. 2005, p. 134-152.
Dan Li et al.; Detection, Classification, and Tracking of Targets; IEEE Signal Processing Magazine; Mar. 2002; p. 17-29.

* cited by examiner

*Primary Examiner* — Edward Cosimano
(74) *Attorney, Agent, or Firm* — Global IP Counselors, LLP

(57) ABSTRACT

A method for localizing an object moving in an unknown environment. The method includes providing k position marks at undetermined positions $p_1, p_2, \ldots, p_k$ that are spaced apart from one another, where $\{p_1, \ldots, p_k\} \in \Re^3$, where k is a natural number greater than or equal to 3, and repeatedly measuring the distances between the object and each of the position marks independently of one another at uncontrolled instants, such that distance values $\{r_1, \ldots, r_n\} \in \Re$ are present at instants $\{t_1, \ldots, t_n\} \in \Re$. The method further includes determining a motion curve $x(t) \in \Re^3$ according to $$x(t) = \sum_{i=1}^{n} \alpha_i k(t, t_i),$$

where n represents a number of distance measurements used and each function $k(t, t_i)$ is a positively defined kernel function, and where $\{\alpha_1, \ldots, \alpha_n\} \in \Re^3$ are coefficient vectors that are estimated using smoothness conditions based on a regularization term formed with the kernel functions.

20 Claims, 8 Drawing Sheets

Fig. 3
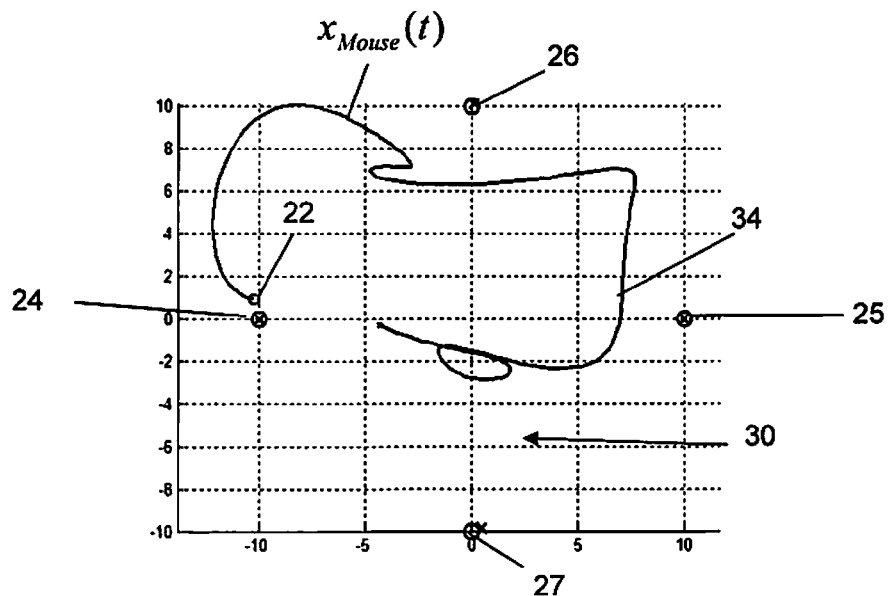
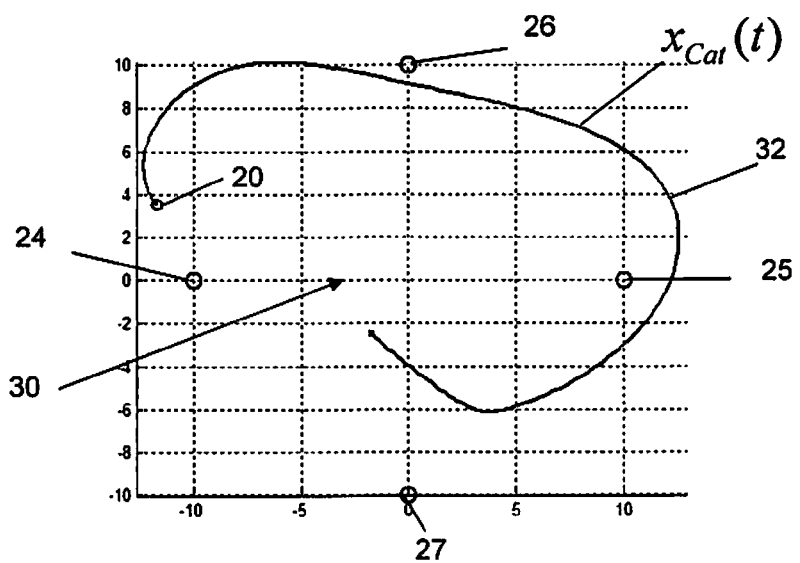
Fig. 4

Fig. 5
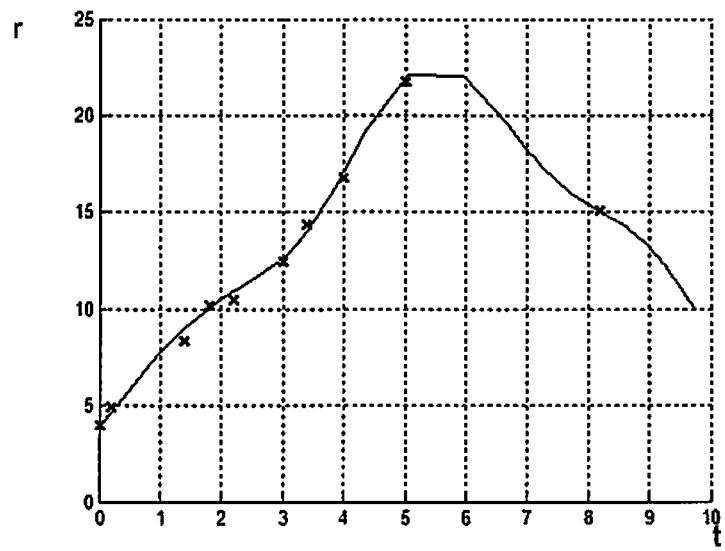
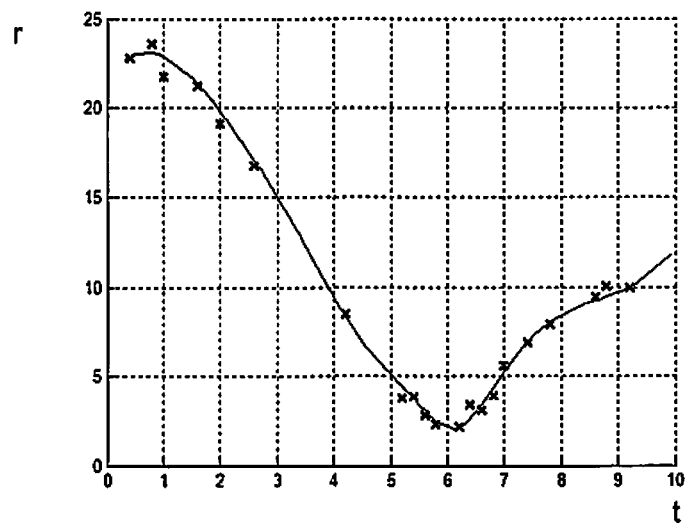
Fig. 6

Fig. 7
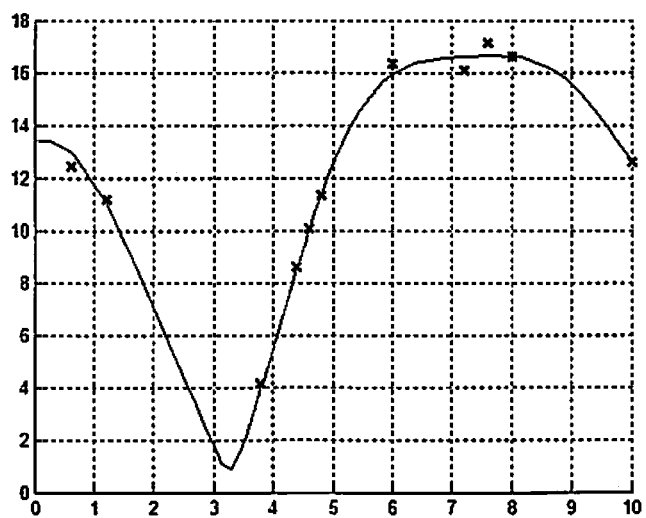
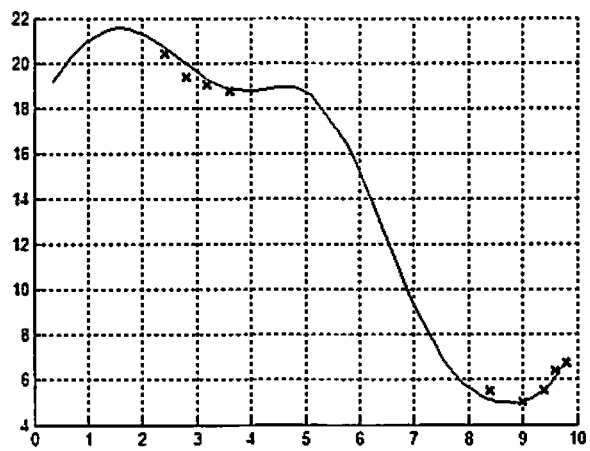
Fig. 8

Fig. 9
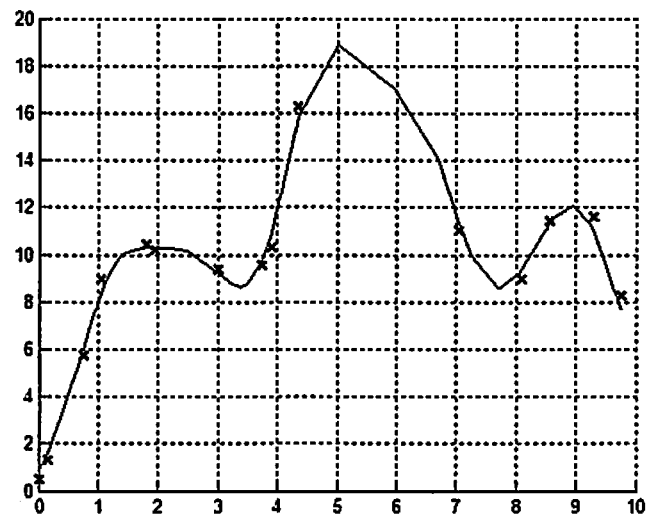
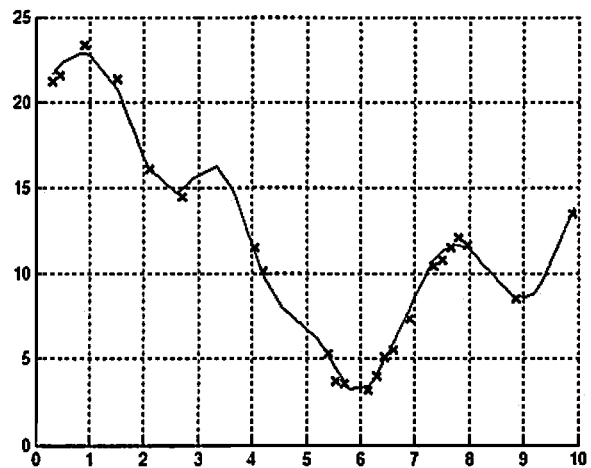
Fig. 10

Fig. 11
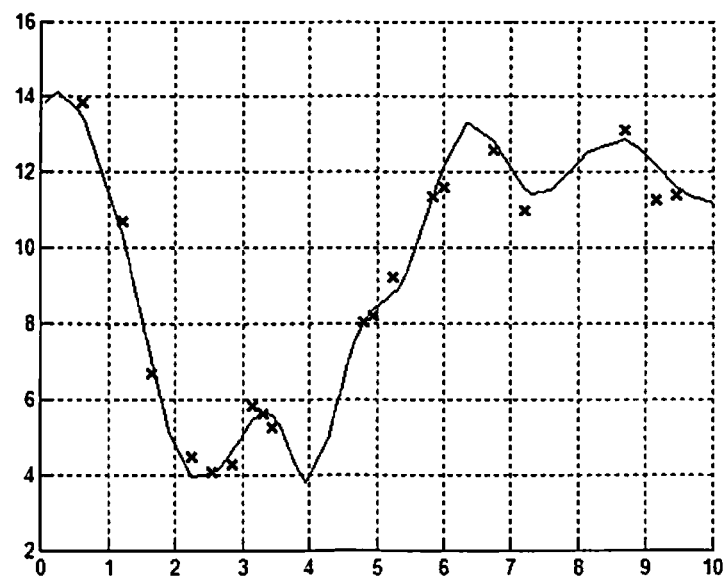
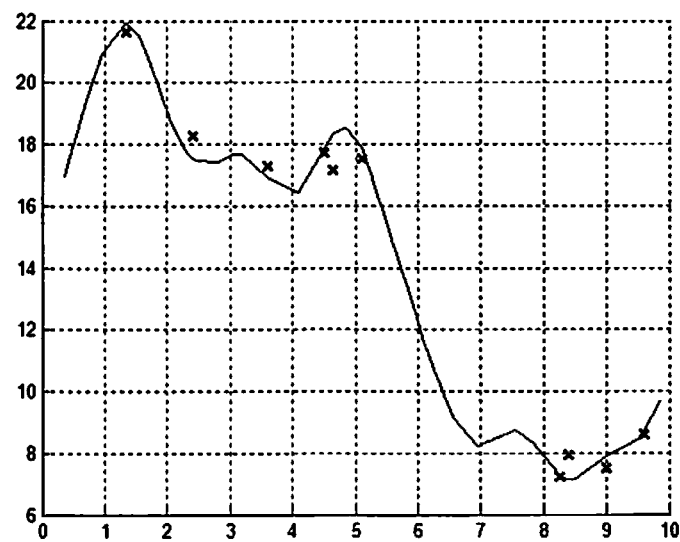
Fig. 12

Fig. 13
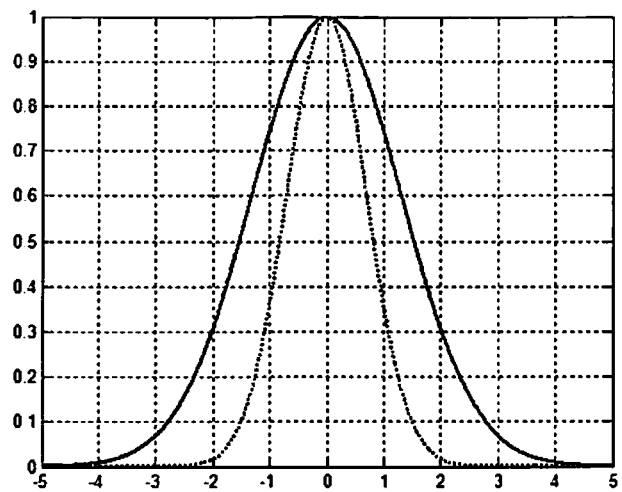
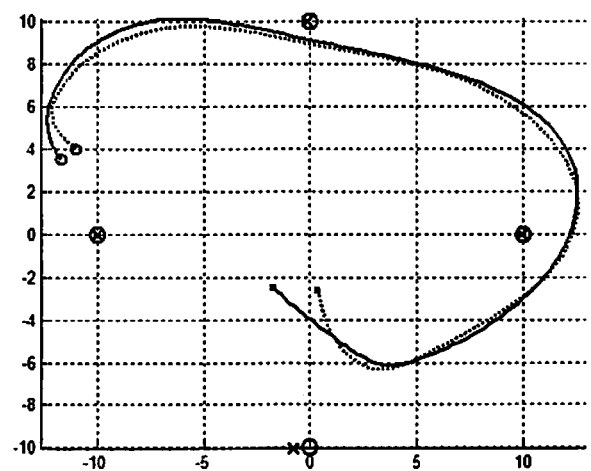
Fig. 14

Fig. 15
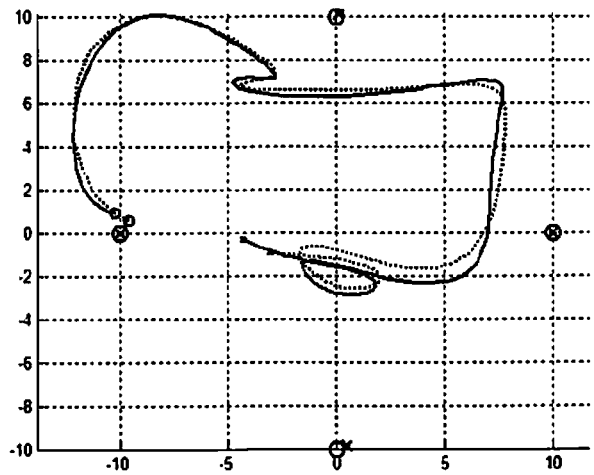
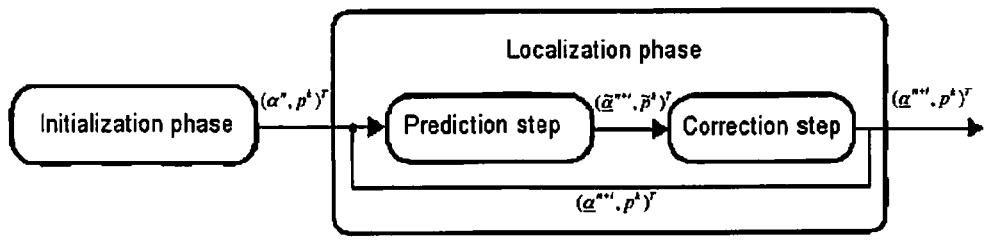
Fig. 16
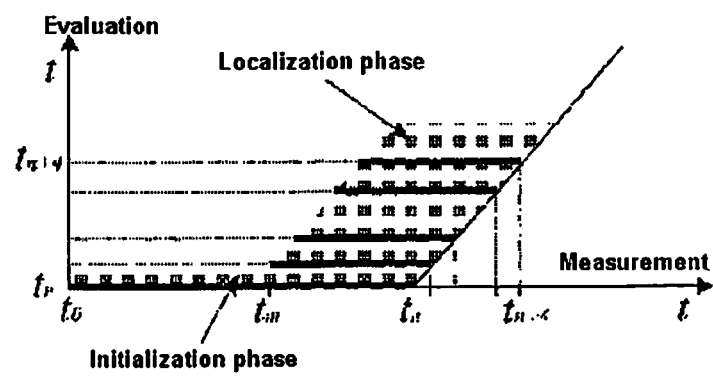
Fig. 17

METHOD AND DEVICE FOR LOCALIZING OBJECTS

CROSS-REFERENCE TO RELATED APPLICATIONS

This U.S. National stage application claims priority under 35 U.S.C. §119(a) to German Patent Application No. 10 2009 007 684.0, filed in Germany on Feb. 5, 2009, the entire contents of which are hereby incorporated herein by reference.

BACKGROUND

1. Field of the Invention

The invention relates to a method and a device for localizing objects in an unknown terrain. In addition, the invention relates to a plurality of uses of such a method and of such a device.

2. Background Information

"Simultaneous Localization And Mapping" (abbreviated to SLAM hereinafter) denotes one of the fundamental problems in autonomous navigation. The problem consists in localization in an unknown environment and simultaneous construction of a map of this environment. It is only by virtue of advances in recent years that it has become possible at all to navigate autonomously in unknown terrain in real time.

Corresponding technologies have been disclosed to the public in particular through the "Grand Challenges" of the American Defense Advanced Research Projects Agency (DARPA). In 2004, 2005 and 2007, DARPA conducted races of unmanned vehicles that had to find their way around by themselves. The corresponding events, in which renowned institutions and scientists participated, were disclosed by the media such as radio, television and Internet. In this case, the autonomous localization of the corresponding vehicles and the construction of a map of the environment constitute a particular challenge.

The following Documents 1 through 4 describe localization and mapping techniques:

[1] B. Schölkopf and A. Smola *Learning with Kernels* MIT Press, Cambridge, Mass., London 2002

[2] C. Taylor, A. Rahimi, J. Bachrach, H. Shrobe and A. Grue *Simultaneous Localization, Calibration, and Tracking in an ad Hoc Sensor Network*, Computer Science and Artificial Intelligence Laboratory Massachusetts Institute of Technology, Cambridge, Mass. 02139

[3] E. Olson, J. Leonard and S. Teller *Robust Range-Only Beacon Localization*, Proceedings of Autonomous Underwater Vehicles, 2004

[4] P. Newman, and J. Leonard *Pure Range-Only Sub-Sea SLAM*, Massachusetts Institute of Technology.

What is problematic in the localization methods known heretofore is that the positions of landmarks or position marks relative to which localization is effected has to be known or at least the position thereof with respect to one another have to be known. By way of example, in SLAM methods used heretofore, the distance and the direction with respect to prominent points in the unknown environment (e.g. a church tower, a flagpole, a mountain peak or a tree) were measured. From information concerning distance and direction it is possible to determine one's own position relatively easily. However, this requires relatively complex measurement techniques. By way of example, it is necessary to work with clear visibility. In darkness or in buildings, such localization is virtually impossible.

In order to carry out most known localization methods, a complex measurement or precise predetermination of position marks is necessary, which in many cases is not possible or can be realized only with relatively complex measurement technology.

Therefore, there is the desire to provide a method for localizing objects by means of which a moving object can localize itself solely on the basis of distance measurements with respect to fixed but per se at unknown positions.

If no distance information between the position marks is available, that is to say no communication between the position marks takes place, there are only very few methods which solve the problem of purely distance-based localization.

The following is a further description of Documents 2, 3 and 4 referenced above.

C. Taylor, A. Rahimi, J. Bachrach, H. Shrobe and A. Grue [2]:

In their study they present a method for localization on the basis of distance measurements. However, this known method has significant disadvantages:

1) It requires synchronized/simultaneous distance measurements of at least four position marks simultaneously per estimation step. The algorithm proposed can only be used for specific configurations; complex synchronization of the distance measurements and a complex measurement technique are necessary.

2) The result is returned in the form of discrete positions. Additional sensors which supply additional data at non-synchronous instants cannot be incorporated into the known method without scanning.

J. Leonard, S. Teller, E. Olson and P. Newman [3],[4]

The authors describe in their study a method for localizing a submarine with distance data with respect to buoys as position marks. This method also has the disadvantages mentioned above and 1) and 2). However, their study mentions the synchronization problem and demands as solution a simple discrete motion model, which then implicitly presupposes that the sensor data arrive at least with a constant clock cycle time. This method is also unsuitable for specific localization problem of interest here.

The problem addressed by the invention is that of providing a method and a device by means of which an object moving in an unknown environment can be localized with less stringent requirements made of the measurement technique.

SUMMARY

The invention provides a method for localizing an object moving in an unknown environment, comprising:

providing k position marks at undetermined positions $p_1$, $p_2 \ldots, p_k$ that are spaced apart from one another, where $\{p_1, \ldots, p_k\} \in \Re^3$, where k is a natural number greater than or equal to 3, repeatedly measuring the distance between object and position mark for each of the position marks independently of one another at uncontrolled instants, such that the distance values $\{r_1, \ldots, r_n\} \in \Re$ are present at the instants $\{t_1, \ldots, t_n\} \in \Re$, and determining a motion curve $x(t) \in \Re^3$ by means of $$x(t) = \sum_{i=1}^{n} \alpha_i k(t, t_i),$$

where n is the number of distance measurements used and each function $k(t, t_i)$ is a positively defined kernel function and where $\{\alpha_1, \ldots, \alpha_n\} \in \Re^3$ are coefficient vectors that are estimated using smoothness conditions by means of a regularization term formed with the kernel functions.

Furthermore, the invention proposes a device for carrying out the method and/or for localizing an object moving in an unknown environment, comprising:

a measuring unit, which is designed for repeatedly measuring the distance between the object and at least three position marks fixedly arranged at undetermined positions for each of the position marks independently of one another at a series of instants and is capable of outputting distance values $\{r_1, \ldots; r_n\} \in \Re$ determined at the instants $\{t_1, \ldots, t_n\} \in \Re$, and an evaluation unit for determining a motion curve $x(t) \in \Re^3$ by means of $$x(t) = \sum_{i=1}^{n} \alpha_i k(t, t_i),$$

where n is the number of distance measurements used and each function $k(t, t_i)$ is a positively defined kernel function and where $\{\alpha_1, \ldots, \alpha_n\} \in \Re^3$ are coefficient vectors, and wherein the evaluation unit is designed for estimating the coefficient vectors using smoothness conditions by means of a regularization term formed with the kernel functions.

The present invention is based on current development in the field of autonomous navigation (SLAM) and on current insights in the field of machine learning methods. In particular, the invention makes it possible to solve the problem of self-localization on the basis of unsynchronized and defective distance data with respect to stationary objects of unknown position.

All the methods described in Documents 2, 3 and 4 referenced above are based on estimating a set of discrete positions at the instants of measured value detection. This problem is underdetermined, from a mathematical point of view, for unsynchronized distance measurements and is therefore insoluble.

In contrast thereto, in the method presented, ambiguities are eliminated by smoothness conditions for the path curve (regularization). In order to realize this, the solution is sought in a function space, to put it more precisely in a so-called RKHS ("reproducing kernel hilbert space") as described in Document 1 referenced above. A set of coefficients with which the space of all path curves can be represented effectively is estimated instead of the desired positions at different instants for the object to be localized. In this case, so-called kernel functions constitute the basis of said RKHS. By means of regularization and thus introduction of "smoothness conditions", the equation system, which is underdetermined per se, is then solved uniquely.

A preferred embodiment of the invention involves estimating the positions of the position marks and also the coefficients for determining the path curve x(t) by minimizing a regularized risk functional. The risk functional is composed, for example, of a cost function, which takes account of the error distribution (e.g. square error distribution), and a regularization or penalty term, which takes account of deviations of the model function chosen as kernel functions from the actual behavior of the dynamic system of the moving object. By minimizing such a regularized risk functional, those values which lead to the minimum can be obtained as a solution for the location of the position marks and for the coefficients for determining the path curve. Corresponding mathematical methods and algorithms are already employed in information technology in the field of machine learning for other purposes, e.g. for image processing, and are therefore already known in principle.

The following advantages can be obtained with the method according to the invention, the device according to the invention or the advantageous embodiments thereof:

1) The main advantage of the method certainly consists in the fact that it is actually possible for the first time, without any loss of information, and thus with high quality, to find a solution to the problem of self-localization solely on the basis of unsynchronized pure distance data (only distance known, no direction).
2) The method has very few parameters that have to be optimized.
3) The result for the path curve is output in an analytical form. Thus, the result can be evaluated at any point in time, and synchronization points for sensor data fusion with other data are therefore not necessary. Furthermore, this form of representation also allows differentiated information, e.g. acceleration data of an IMU (inertial measurement unit), to be incorporated.
4) The method has a comparatively high flexibility with regard to the modeling of different localization problems.

BRIEF DESCRIPTION OF THE DRAWINGS

The invention is explained in greater detail below with reference to the accompanying drawings, in which:

FIG. 3 shows a schematic illustration of a first object moving in an unknown environment with high dynamic range on the basis of the example of a mouse moving in an unknown space with four fixed position marks;

FIG. 4 shows a schematic illustration of a second object moving, in the same space with lower dynamic range on the basis of the example of a cat pursuing the mouse;

FIG. 5 shows a schematic graph showing the temporal profile of the real distance between the cat and the first position mark and defective distance values measured at different times;

FIG. 6 shows a schematic graph showing the temporal profile of the real distance between the cat and the second position mark and defective distance values measured at different times;

FIG. 7 shows a schematic graph showing the temporal profile of the real distance between the cat and the third position mark and defective distance values measured at different times;

FIG. 8 shows a schematic graph showing the temporal profile of the real distance between the cat and the fourth position mark and defective distance values measured at different times;

FIG. 9 shows a schematic graph showing the temporal profile of the real distance between the mouse and the first position mark and defective distance values measured at different times;

FIG. 10 shows a schematic graph showing the temporal profile of the real distance between the mouse and the second position mark and defective distance values measured at different times;

FIG. 11 shows a schematic graph showing the temporal profile of the real distance between the mouse and the third position mark art: defective distance values measured at different times;

FIG. 12 shows a schematic graph showing the temporal profile of the real distance between the mouse and the fourth position mark and defective distance values measured at different times;

FIG. 13 shows graphs of kernel functions used for a localization method for localizing the cat and for localizing the mouse;

FIG. 14 shows a graphical illustration for comparing the real path of the cat and the real positions of the position marks with a path for the cat obtained by means of the localization method and with the positions of the position marks obtained by means of the localization method;

FIG. 15 shows a graphical illustration for comparing the real path of the mouse and the real positions of the position marks with a path for the mouse obtained by means of the localization method and with the positions of the position marks obtained by means of the localization method;

FIG. 16 shows a schematic block illustration of a possible further refinement of a localization method, said refinement being based on the localization method presented here;

FIG. 17 shows a schematic illustration of different phases of the refinement in accordance with FIG. 16.

DETAILED DESCRIPTION OF EMBODIMENTS

Figure 1:
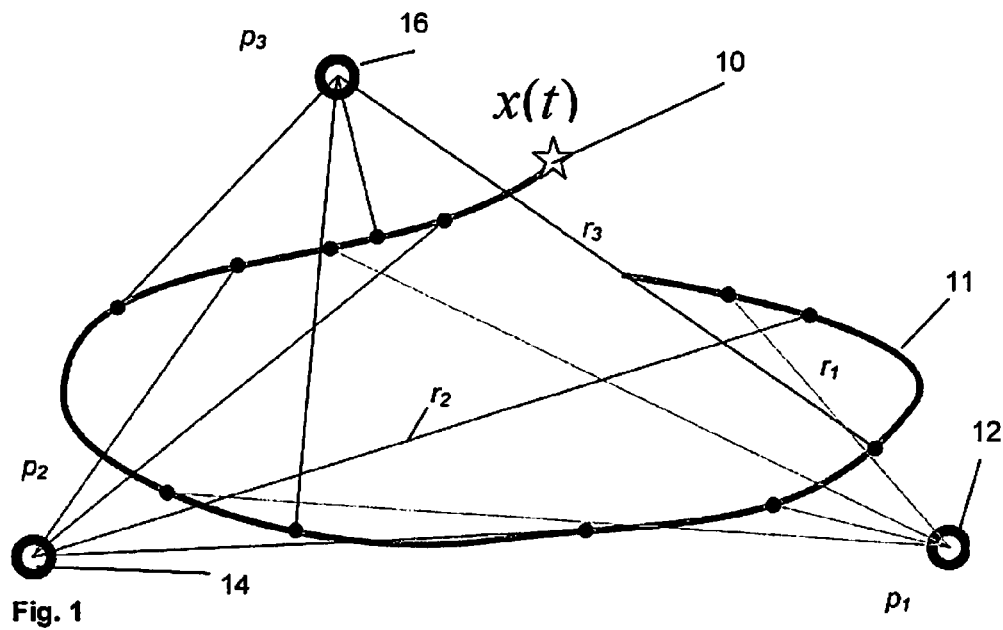
FIG. 1 shows a schematic illustration of a motion curve of an object in an unknown environment.

FIG. 1 illustrates the motion of an object 10 in an unknown environment on the basis of a motion curve 11. The motion curve represents a function of the three-dimensional location, that is to say that $x(t) \in \Re^3$. The representation can be effected for example in Cartesian coordinates with the coordinate axes x, y, z, that is to say for instance in the form $x(t)=(x^x(t), x^y(t), x^z(t))$.

Figure 2:
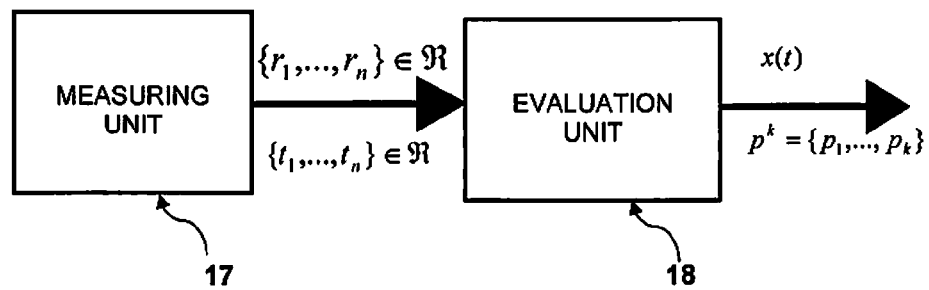
FIG. 2 shows a schematic illustration of the input and output data of a method for localizing the object and the position marks used for localization.

In order to localize the object 10, at least three position marks 12, 14, 16 are provided at undetermined locations $p_1=(p_1^x, p_1^y, p_1^z)$, $p_2=(p_2^x, p_2^y, p_2^z)$, $p_3=(p_3^x, p_3^y, p_3^z)$. At undetermined instants $t_i$, the pure distance r between the object 10 and a respective one of the position marks 12, 14, 16 is measured by means of a measuring unit 17 as shown in FIG. 2.

The localization of rescuers in an unknown building (not illustrated) may be mentioned as a possible application.

Firstly, landmarks are fitted/dropped around or in the corresponding building at arbitrary unknown positions. Said landmarks represent the position marks 12, 14, 16. By way of example, the rescuers fit small transmitters or transceivers (not illustrated) at a plurality of places in the building. Another possibility is that corresponding transmitters can be dropped at arbitrary places around the building by helpers from the air. In this case, preferably more than three position marks, e.g. at least four, or even ten or twenty position marks, are provided. The number of active position marks can also change during the method.

The rescuers, who are each equipped with a transceiver (not illustrated), which can measure distances from the individual transmitters or transceivers at the position marks 12, 14, 16, thereupon enter the building and can be localized after a short initialization phase (possibly after 1 min) relative to the node network formed by the position marks 12, 14, 16. At the same time, the topology of the node network is estimated in this case.

This takes place in evaluation electronics which are present, e.g., in the form of an evaluation unit 18 as shown in FIG. 2, which can be configured as a mobile data processing unit carried by the rescuers and are connected to the transceiver of the rescuers in order to obtain the distance data.

Thus, a method for localizing the object 10 is carried out automatically in the measuring unit 17 and in the evaluation electronics in the evaluation unit 18.

Consequently, only unsynchronized distance data are available as input data for the method. The result of the method is a path curve x(t) for the object to be localized and also the position data $p^k=\{p_1, \ldots, p_k\}$ of the employed position marks with respect to which the distance data were measured.

For the relative positioning, therefore,
no prior knowledge about the motion,
no prior knowledge about the position mark positions,
no further sensor system,
and also no temporal synchronization or communication of the position marks are required.

In this method, ambiguities are eliminated by means of smoothness conditions for the path curve x(t), that is to say in particular by means of regularization. In order to realize this, the solution is sought in a function space, to put it more precisely in a so-called RKHS ("reproducing kernel hilbert space"); in this respect, also see more precisely in Document 1 cited above, to which express reference is made for further details and which is incorporated by reference.

A set of coefficients with which the space of all path curves can be represented effectively is estimated instead of the desired positions at different instants for the object to be localized. In this case, so-called kernel functions constitute the basis of said RKHS. By means of regularization and thus introduction of "smoothness conditions", the equation system, which is underdetermined per se, is then solved uniquely.

The starting point is as follows; there are at least three position marks 12, 14, 16, preferably more position marks, generally k position marks where k≥3, and preferably where k>3. The position marks can be present in the form of transmitters or the like, by means of which the distance from the object 10 to be localized can be measured by means of known methods. A fireman who moves through the unknown building mentioned above could be mentioned as an example of an object to be localized. The at least three position marks 12, 14, 16 are arranged around the building in the manner shown in FIG. 1.

This system is initially highly undetermined. As shown, the fireman, on his accompanying unit (e.g. transceiver), can possibly receive at the instant $t_1$ only a distance $r_1$ from the first measurement or position mark 12 ($p_1$). At an instant $t_2$, while he has gone somewhat further away, he receives a distance $r_2$ from the second measurement or position mark 14 ($p_2$). At a third instant $t_3$, he receives a distance $r_3$ from the third measurement or position mark 16 ($p_3$). The reception need not be alternating or regular. Some signals will perhaps not be received with sufficient quality. Thus, at a fourth instant $t_4$, the fireman can e.g. again receive a distance $r_4$ from the second measurement or position mark 14 ($p_2$); and at a fifth instant $t_5$ he receives a distance $r_5$ from the first measurement or position mark 12 ($p_1$), etc. At all these five instants, however, the fireman has moved further. Accordingly, per measurement at the instant $t_i$ there are three unknowns, namely in each case the coordinates of the position $x^x(t_i)$, $x^y(t_i)$, $x^z(t_i)$, but to that end in each case only one new measured value, namely the distance $r_i$ from the respective position mark $p_{a_i}$, where $a_i$ represents the index for the position mark which is associated with the distance measurement $r_i$ and with respect to which the distance $r_i$ was measured. In the case of the abovementioned measurement at the instant $t_4$, $a_i$ would accordingly be 2; after all, the distance from the position mark $p_2$ was measured.

This system has hitherto been mathematically insoluble because there are three unknowns but only one measured value. Therefore, the system is mathematically underdetermined.

The solution to this problem lies in an estimation. It is assumed that the object cannot move arbitrarily and the dynamic system represented by the moving object 10 has specific properties. Every dynamic system will exhibit a specific behavior. In this respect, a supertanker, the fireman or a fly moving in the space may be mentioned as an example.

The supertanker moves at a slow constant speed and can hardly change this movement direction within a specific time. In this respect, the movement of a supertanker is very readily foreseeable. The fly makes several changes in direction within a few seconds, such that the dynamic system of a fly is very uncertain and undetermined. A fireman will range between these two extremes.

The solution approach lies here, then, in finding for the respective dynamic system an appropriate function with which the respective position of the object can be correspondingly estimated.

The solution can be improved by the choice of the function. An ideal choice of the function would be the so-called impulse response of the dynamic system. Such impulse responses are known from electrical engineering. A sharp impulse is given to the system and the response of this system is then examined. Applied to mechanical systems, mention could be made of a billiard ball. If said billiard ball is struck, then it will move in a specific direction. The impulse response of a billiard ball would accordingly be a linear movement in a straight line, although a specific damping behavior would be present. If the impulse response of the dynamic system were known, then this would be the ideal solution. For many dynamic systems, such an impulse response will be able to be established on the basis of simulation calculations as a function.

However, specific other functions can also be utilized. By way of example, a Gaussian curve can be adopted as a suitable approach for a relatively undetermined dynamic system.

However, the curve should be adapted to the respective dynamic system. In the example of the Gaussian curve this means that the Gaussian curve can be relatively wide in the case of a supertanker. In the example of the fly, the Gaussian curve should be very narrow. The background is that, in the case of the supertanker, it can be assumed that it will still be moving in the same direction after one second, or even also after one minute. Accordingly, the probability of the motion is relatively well determined, such that a wide Gaussian curve can also be taken. In the case of the fly, the future is far more undetermined, and so it is also only possible to make minor statements on the future. Therefore, the Gaussian curve should be chosen to be significantly narrower on the time axis.

For simple representation we make the following assumption. We have three measurements at the instants $t_1$, $t_2$, $t_3$. The position $x^x(t)$ of the object 10 on the x-axis can be represented by equation (1):

$$x^x(t) = \alpha_1^x k_1(t) + \alpha_2^x k_2(t) + \alpha_3^x k_3(t) \quad (1)$$

$\alpha_1^x$, $\alpha_2^x$, $\alpha_3^x$ represent unknown coefficients. $k_1(t)$, $k_2(t)$, $k_3(t)$ represent the selected assumed functions. The positions $x^x$ at the instant $t$ then results from this equation. The coefficients $\alpha_1^x$, $\alpha_2^x$, $\alpha_3^x$ are to be determined. As an approach, e.g. the Gaussian functions are chosen here as functions. Instead of said Gaussian functions, other functions could also be chosen, as already explained above.

What is common to all the valid functions is that they are so-called positive definite kernel functions.

That is to say that the Gram matrix composed of the kernel functions has to be positive definite. $k_1(t)$ represents the function defined at the instant $t_1$. $k(t_1, t_x) = k_1(t_x)$ represents the value yielded by the function defined at the instant $t_1$ with respect to the value $t_x$.

If this function is then used to establish the Gram matrix K $$K = \begin{bmatrix} k(t_1, t_1) & \cdots & k(t_1, t_n) \\ \vdots & \ddots & \vdots \\ k(t_n, t_1) & \cdots & k(t_n, t_n) \end{bmatrix} \quad (2)$$

then the latter is positive definite.

Positive definite means that the vector product represented in expression (3) below is positive:

$$(\alpha_1^x \; \alpha_2^x \; \alpha_3^x) \cdot \begin{pmatrix} k(t_1 t_1) & k(t_1 t_2) & k(t_1 t_3) \\ k(t_2 t_1) & k(t_2 t_2) & k(t_2 t_3) \\ k(t_3 t_1) & k(t_3 t_2) & k(t_3 t_3) \end{pmatrix} \begin{pmatrix} \alpha_1^x \\ \alpha_2^x \\ \alpha_3^x \end{pmatrix} > 0 \quad (3)$$

In the method presented here, such a vector product is used as a regularization term.

The assumption of the functions is thus used for regularization. Said term (3) can also be called "penalty term". If functions which do not correspond to the dynamic system have been chosen, the coefficients $\alpha_1^x$, $\alpha_2^x$, $\alpha_3^x$, etc. change accordingly. The latter then have to become correspondingly greater in order to adapt this function again. Applying the coefficients to the Gram matrix then results in the appropriate regularization term. Said regularization term describes how appropriately the corresponding function $k(t, t_i)$ describes the dynamic range.

The coefficients $\alpha_1^x$, $\alpha_2^x$, $\alpha_3^x$ are obtained by optimization, that is to say, in particular, the minimization of the term (3). More precisely, a risk functional formed thereby is optimized, as will be explained in even greater detail below.

A further determining variable can thus be introduced into the system in order then to uniquely solve the problem mentioned above.

The following designations are used in the context of the following more precise representation of the methodology:

| | |
|---|---|
| $\{t_1, \ldots, t_n\} \in \Re$ | Instants at which (distance) measurements are present |
| $x(t) \in \Re^3$ | Position of the object to be localized at the instant t |
| $\{p_1, \ldots, p_k\} \in \Re^3$ | Positions of the position marks available for the measurements |
| $\{r_1, \ldots, r_n\} \in \Re$ | Distance measurements |
| $\{a_1, \ldots, a_n\} \in N$ | Indexing of the position marks per measurement. Example: The i-th measurement $r_i$ measures the distance between the object with the position $x(t_i)$ and the position mark having the designation $a_i$. |

The path curve x(t) sought is parameterized as follows:

$$x(t) = \sum_{i=1}^{n} \alpha_i k(t, t_i) \quad (4)$$

The functions $k(t,t_i)$ form the basis of the RKHS. The path curve x(t) is described completely by the coefficient vectors $\alpha_1, \ldots, \alpha_n$ from the $\Re^3$. Accordingly, the number of functions used is just the same as the number of measurements. For the measurement at the instant $t_1$ there is then the function $k(t,t_1)$. For the measurement at the instant $t_2$ there is the function $k(t,t_2)$, etc.

For the method presented here it is provided that the basis functions $k(t,t_i)$ are so-called positive definite kernel functions as described in Document 1 referenced above. A typical choice for a positive defined kernel function has the form of a Gaussian bell (5):

$$k(t, t') = \exp\left(-\frac{\|t - t'\|^2}{2\sigma^2}\right) \quad (5)$$

In this case, as is usual for Gaussian bells, σ as standard deviation represents a measure of the width of the Gaussian curve. Depending on the dynamic range of the system, it should be chosen to be smaller (high dynamic range) or wider (low dynamic range). The double lines here indicate the magnitude, also vector magnitude, if appropriate.

The kernel function suitable for the corresponding application can, however, for example, also be determined offline by means of the impulse response of the dynamic system to be examined. It can even be shown that this choice of the kernel function may be deemed to be ideal under certain preconditions. The kernel functions in this way models the dynamic range of the system.

The way in which the positions of the position marks and also the coefficient vectors can be estimated will now be explained below.

At the beginning of a localization of the object moving in the unknown environment, no prior knowledge whatsoever is assumed. Firstly a first solution for the path curve and for the positions of the position marks 12, 14, 16 that have become evident by then is intended to be obtained.

All data present by then are used for the calculation. By means of a mathematical optimization method (e.g.: Levenberg-Marquardt method, . . . ), the solution for the coefficients of the path curve and of the positions of the position marks is obtained by minimizing the following expression—"regularized risk functional"—(6):

$$\underbrace{R_{reg}(\alpha, p)}_{\text{Risk functional}} = \quad (6)$$

$$\underbrace{\frac{1}{n}\sum_{i=1}^{n}(\|x_i - p_{a_i}\| - r_i)^2}_{\text{Cost function}} + \underbrace{\mu\left(\alpha_x^{nT} K \alpha_x^n + \alpha_y^{nT} K \alpha_y^n + \alpha_z^{nT} K \alpha_z^n\right)}_{\text{Regularization term}}$$

The solution for α and for ρ can thus be represented as follows:

$$\operatorname*{argmin}_{\alpha, p} R_{reg}(\alpha, p)$$

in this case, K is the Gram matrix $$K = \begin{bmatrix} k(t_1, t_1) & \cdots & k(t_1, t_n) \\ \vdots & \ddots & \vdots \\ k(t_n, t_1) & \cdots & k(t_n, t_n) \end{bmatrix}$$

$\alpha_x^n$, $\alpha_y^n$ and $\alpha_z^n$ are the coefficient vectors $$\alpha_x^n = (\alpha_1^x, \ldots, \alpha_n^x)^T \; \alpha_y^n = (\alpha_1^y, \ldots, \alpha_n^y)^T \; \alpha_z^n = (\alpha_1^z, \ldots, \alpha_n^z)^T$$

and $$p^k = (p_1^x, p_1^y, p_1^z, \ldots, p_k^x, p_k^y, p_k^z)^T$$

a vector containing the positions of the position marks.

The superscripted T means here that the vector is transposed. The vector product is therefore carried out with a horizontal vector and then with a vertical vector.

The scalar parameter μ is a parameter which is to be adapted to the respective application or to be optimized and which represents the weighting between regularization (regularization term) and minimization of the square errors (cost function). The scalar parameter can be determined empirically by experiment and possibly also be embodied as adjustable for adaptation at the evaluation unit 18 shown in FIG. 2.

The vector $x_i$ represents the location of the object at the instant $t_i$. This unknown value is inserted in equation (6) in accordance with equation (4) as follows:

$$x_i = x(t_i) = \sum_{j=1}^{n} \alpha_j k(t_i, t_j). \quad (7)$$

Written out in full, the risk functional to be minimized thus reads:

$$R_{reg}(\alpha, p) = \frac{1}{n}\sum_{i=1}^{n}\left(\left\|\sum_{j=1}^{n} \alpha_j k(t_i, t_j) - p_{a_i}\right\| - r_i\right)^2 + \quad (8)$$

$$\mu\left(\alpha_x^{nT} K \alpha_x^n + \alpha_y^{nT} K \alpha_y^n + \alpha_z^{nT} K \alpha_z^n\right)$$

A first estimation for the probability distribution of the positions of the object to be localized and of the positions of the position marks is finally obtained as a result of the minimization.

An estimation for the covariance matrix of the individual parameters can be obtained from the Hessian matrix of the regularized risk functional by means of the "Laplace method", for example. The covariance matrix indicates how good the estimation is which is carried out by means of the method presented here. It can be used in a later course of a continuation of a continuous localization for forming a Kalman filter used for this purpose.

Observation:

For the minimization of term (6) mentioned above it may be advantageous to use, instead of the coefficients α″ directly the eigenvectors of the Gram matrix K as an alternative basis.

A concrete application of the localization method just described to a concrete simple example is described below with reference to FIGS. 3 to 15. The following concrete example is in particular also intended to clarify the influence of the kernel function on the solution.

In the example, a cat 20 chases a mouse 22 through a room 30 in which are situated four articles 24, 25, 26, 27 of unknown position, which measure their distances from mouse 22 and cat 20 at uncontrollable instants. The movement of the mouse 22 through the room is illustrated in FIG. 3 and the movement of the cat 20 through the room is illustrated in FIG. 4. The cat 20 and the mouse 22 are examples of objects which move in an unknown environment, here the room 30, and which are now intended to be localized. The four articles 24, 25, 26, 27 represent four nodes of a node network and the first to fourth position mark $p_1$, $p_2$, $p_3$, $p_4$.

In FIGS. 3 and 4, the x-axis of the graph represents the spatial x-axis in the unit of meters, while the y-axis represents the spatial y-axis likewise in the unit of meters. The motion curve $x_{Cat}(t)$ of the cat is designated by 32 and the motion curve $x_{Mouse}(t)$ is designated by 34.

The higher agility of the mouse 22 can clearly be seen. While the mouse 22 can dart from side to side in order to shake off the cat 20, the cat 20 runs in a significantly straighter line owing to its greater mass and even has to run around the second article 25 after a sharp turn by the mouse.

For the cat, the distances indicated in the graphs in FIGS. 5 to 8 are measured for the four articles 24, 25, 26, 27. In said graphs, the distances in meters are in each case plotted on the y-axis, and the time in seconds on the x-axis. The solid curve indicates the real distance between cat 20 and corresponding article 24, 25, 26, 27, while the crosses indicate the defective individual measurement values.

FIG. 5 shows the distances between the cat 20 and the first article 24; FIG. 6 shows the distances between the cat 20 and the second article 25; FIG. 7 shows the distances between the cat 20 and the third article 26; and FIG. 8 shows the distances between the cat 20 and the fourth article 24.

In an analogous manner, FIGS. 9 to 12 show the corresponding distances between the mouse 22 and the articles 24, 25, 26, 27, wherein FIG. 9 shows the distances from the first article 24, FIG. 10 shows the distances from the second article 25, FIG. 11 shows the distances from the third article 26 and FIG. 12 shows the distances from the fourth article 27.

As seen altogether over all the nodes and position marks, the number of measured distances for the motion of the cat is 51, and for the mouse 67.

In this case, a noise model corresponding to a normally distributed noise with a standard deviation of 0.4 meter was assumed as distribution for the for the distance measurements.

For both examples, the path curve and the positions of the measurement nodes—articles 24, 25, 26, 27, i.e. position marks—were then determined by means of the method presented.

As kernel function, different "Gaussian bells" were used for the motion of the cat 20 and of the mouse 22, these being illustrated in FIG. 13. In this case, the dotted line represents the kernel function for the localization of the mouse 22 and the solid line represents the kernel function for the localization of the cat 20.

Carrying out the method explained above including the optimization of the regularized risk functional (6) gives rise to the results illustrated in FIGS. 14 and 15 for the path of the cat 20 (FIG. 14) and of the mouse 22 (FIG. 15) and also for the positions of the articles 24, 25, 26, 27. The results for the path are represented in each case as dotted lines, while the solid line indicates the actual motion for comparison.

As can be seen from FIGS. 14 and 15, the method presented here, despite the very small amount of information from the distance measurements, yields relatively accurate approximations for the actual motion curves.

The method presented can therefore be used extremely well for localizing objects by utilizing only very simple and therefore cost-effective measurement technology. Alternatively, the method can also be employed with extremely high-quality measurement technology, but under impeded reception conditions such as, for example, in buildings or tunnels, in mines or the like or else in the military field, e.g. in rescue or assault actions, where a continuous synchronized distance measurement as required hitherto cannot be ensured. By way of example, use on other ships, for example in actions for liberating ships occupied by pirates, is also conceivable. In particular, the position marks can be formed by very simple transmitters or other simple units for distance measurement which, after being dropped or used, can quite simply be left in place.

As shown by the examples, the method is also extremely useful for localization when relatively small numbers of measurement values are presented (e.g. be it 100 or a few hundred).

If the measurements continue, however, over time this gives rise to more and more measurements which make continuous optimization by the previously described method ever more complex and therefore more costly, and so the calculations also take longer and longer.

Therefore, in one preferred embodiment of a localization method, the previously described method, in which all the measurement values are used to, thereby determine the position of the object and of all the position marks that come into action, is carried out only in an initialization phase at the beginning. The overall methodology might then have the appearance as illustrated in FIG. 16. Accordingly, this overall methodology has, alongside the initialization phase, additionally a further phase, which is designated here as a localization phase.

On the basis of the first estimations for $\alpha^n$ and $p^k$ obtained in the initialization phase, in the localization phase the position mark positions and the coefficients are estimated continuously in a manner similar to a Kalman filter. As a result of the above-described design of the solution as a weighted sum of kernel functions, the number of parameters increases continuously in this case.

A new parameter (in the form of a coefficient vector) $\alpha_i$ is added for each new distance measurement at the instant $t_i$. In contrast to the initialization phase, during the localization phase only those coefficients which influence the current position are estimated in each case. Those coefficients which correspond to measurements even further back in time and the estimation of which actually cannot be improved any more by the current measurement are used as prior knowledge in the form of constant parameters.

Assuming that $$k(t,t') \approx 0$$

for all $$|t-t'| > T,$$

where T indicates a time period starting from which the influence of measurements further back in time is negligible, this gives rise to the fact that the instant $t_{n+1}$ for the path curve only the coefficients $$\underline{\alpha}_x^{n+i}=(\alpha_m^x,\alpha_m^y,\alpha_m^z,\ldots,\alpha_{n+}^x,\alpha_{n+1}^y,\alpha_{n+1}^z)^T$$

have to be estimated if $$|t_{n+1}-t_m|>T.$$

In the illustration in FIG. 17, the time intervals in which the measurements are used and instants of the evaluation are illustrated graphically for the initialization phase and the localization phase.

In this case, the parameter vector $p^k$ for the estimations of the position mark positions is dynamically increased if a new position mark appears. Therefore, new position marks can also be added continuously; the system is correspondingly flexible.

As in the case of the Kalman filter, it is proposed that in each new localization a prediction step is carried out, in which an estimation for the new solution $(\tilde{\underline{\alpha}}^{n+i},\tilde{p}^k)^T$ is produced on the basis of the solution found by them for $(\underline{\alpha}^n,p^k)^T$ or $(\underline{\alpha}^{n+i-1},p^k)^T$, and after that a correction step is carried out, which improves the predicted solution by renewed minimization of the optimization problem already indicated above in the case of equation (6) for the corresponding new coefficient set to form a new solution $(\underline{\alpha}^{n+i},p^k)^T$.

What is claimed is:

1. A computer-implemented method for localizing an object moving in an unknown environment, comprising executing on a processor the operations of:
    providing k position marks at undetermined positions $p_1$, $p_2 \ldots, p_k$ representing real positions in the unknown environment that are spaced apart from one another, where $\{p_1,\ldots,p_k\}\in\mathfrak{R}^3$, where k is a natural number greater than or equal to 3, each of the position marks including a respective transmitter configured to emit a respective signal;
    repeatedly operating a transceiver included at the object to receive the respective signals emitted by the respective transmitters of the position marks at uncontrolled instants, and processing the respective signals to determine distances between the object and each of the position marks independently of one another at the uncontrolled instants, such that the distances are represented by distance values $\{r_1,\ldots,r_n\}\in\mathfrak{R}$ which are present at the uncontrolled instants $\{t_1,\ldots,t_n\}\in\mathfrak{R}$; and
    determining a motion curve $x(t)\in\mathfrak{R}^3$ according to $$x(t)=\sum_{i=1}^{n}\alpha_i k(t,t_i),$$

where n represents a number of distance measurements used and each function $k(t,t_i)$ is a positively defined kernel function, and where $\{\alpha_1,\ldots,\alpha_n\}\in\mathfrak{R}^3$ are coefficient vectors that are estimated using smoothness conditions based on a regularization term formed with the kernel functions.

2. The computer-implemented method as claimed in claim 1, further comprising executing on the processor the operations of
    determining an impulse response function indicating an impulse response of a dynamic system formed by motion of the object; and
    wherein the determining uses the impulse response function as a kernel function $k(t,t')$ for determining the motion curve.

3. The computer-implemented method as claimed in claim 1, further comprising executing on the processor the operation of
    forming the regularization term from a vector product of the coefficient vectors with a Gram matrix of the kernel functions.

4. The computer-implemented method as claimed in claim 1, further comprising executing on the processor the operation of
    estimating positions $\{p_1,\ldots,p_k\}\in\mathfrak{R}^3$ of the position marks and the coefficient vectors $\{\alpha_1,\ldots,\alpha_n\}\in\mathfrak{R}^3$ by minimizing a regularized risk functional, which, when using Cartesian coordinates, are represented by $$R_{reg}(\alpha^n,p^k)=\frac{1}{n}\sum_{i=1}^{n}(\|x_i-p_{a_i}\|-r_i)^2+\mu(\alpha_x^{n^T}K\alpha_x^n+\alpha_y^{n^T}K\alpha_y^n+\alpha_z^{n^T}K\alpha_z^n)$$

where $$x_i=x(t_i)=\sum_{j=1}^{n}\alpha_j k(t_i,t_j)$$

where

K represents the Gram matrix $$K=\begin{bmatrix}k(t_1,t_1)&\ldots&k(t_1,t_n)\\ \vdots&\ddots&\vdots\\ k(t_n,t_1)&\ldots&k(t_n,t_n)\end{bmatrix};$$

$\alpha_x^n$, $\alpha_y^n$ and $\alpha_z^n$ represents x, y, and z coordinates of the coefficient vectors where $$\alpha_x^n=(\alpha_1^x,\ldots,\alpha_n^x)^T,\alpha_y^n=(\alpha_1^y,\ldots,\alpha_n^z)^T,$$

and $\alpha^n=(\alpha_1,\ldots,\alpha_n)$ where $$\alpha_1=(\alpha_1^x\alpha_1^y\alpha_1^z),\alpha_2=(\alpha_2^x\alpha_2^y\alpha_2^z),\ldots,\alpha_n=(\alpha_n^x\alpha_n^y\alpha_n^z);$$

$p^k$ represents a vector which contains the positions $\{p_1,\ldots,p_k\}\in\mathfrak{R}^3$ of the position marks represented in a form $p^k=(p_1^x,p_1^y,p_1^z,\ldots,p_k^x,p_k^y,p_k^z)^T$; and $\mu$ represents a scalar parameter to be adapted to the object by empirical determination, and serving for weighting between the regularization term $(\alpha_x^{n^T}K\alpha_x^n+\alpha_y^{n^T}K\alpha_y^n+\alpha_z^{n^T}K\alpha_z^n)$ and a cost function $$\frac{1}{n}\sum_{i=1}^{n}(\|x_i-p_{a_i}\|-r_i)^2.$$

5. The computer-implemented method as claimed in claim 1, wherein
    the providing k position marks comprises using stationary transmitters or transceivers as position marks; and
    the repeatedly measuring comprises determining the distance between a respective transmitter or transceiver and a receiver or transceiver concomitantly moving with the object.

6. The computer-implemented method as claimed in claim 1, further comprising locating the object on a map based on the distance values.

7. The computer-implemented method as claimed in claim 1, wherein
the positively defined kernel function is based on the following Gaussian function $$k(t, t') = \exp\left(-\frac{\|t - t'\|^2}{2\sigma^2}\right)$$

wherein t represents time and σ represents standard deviation.

8. The computer-implemented method as claimed in claim 7, further comprising executing on the processor the operation of
selecting the standard deviation σ in accordance with a dynamic range of the object such that a first value of the standard deviation σ is selected when the object has motion that changes more rapidly with regard to at least one of magnitude and direction and a second value of the standard deviation σ, smaller than the first value of the standard deviation σ, is selected when the object has motion that changes more slowly with regard to at least one of magnitude and direction.

9. The computer-implemented method as claimed in claim 1, wherein
the unknown environment includes an unknown terrain or building; and
the method further comprises locating the object in the unknown terrain or building based on the distance values.

10. The computer-implemented method as claimed in claim 9, wherein
the providing provides the position marks at different locations proximate to the unknown terrain or building.

11. A device for localizing an object moving in an unknown environment, comprising:
a measuring unit configured to repeatedly measure distances between the object and at least three position marks, each of the position marks including a respective transmitter configured to emit a respective signal and being fixedly arranged at undetermined positions representing real positions in the unknown environment, the measuring unit comprising a transceiver disposed at the object and a processor, the processor being configured to execute an operation of repeatedly operating the transceiver to receive the respective signals emitted by the respective transmitters of the position marks at uncontrolled instants, and process the respective signals to determine the distances between the object and each of the position marks independently of one another at the uncontrolled instants, such that the distances are represented by distance values $\{r_1, \ldots r_n\} \in \Re$ determined at the uncontrolled instants $\{t_1, \ldots, t_n\} \in \Re$; and
an evaluation unit comprising a processor configured to execute an operation of determining a motion curve $x(t) \in \Re^3$ according to $$x(t) = \sum_{i=1}^{n} \alpha_i k(t, t_i),$$

where n is the number of distance measurements used and each function $k(t, t_j)$ is a positive definite kernel function and
where $\{\alpha_1, \ldots, \alpha_n\} \in \Re^3$ are coefficient vectors, and wherein the evaluation unit is further configured to estimate the coefficient vectors using smoothness conditions based on a regularization term formed with the kernel functions.

12. The device as claimed in claim 11, wherein
the measuring unit includes at least three position mark marking units configured to form or mark the at least three position marks and at least one object marking unit, the measuring unit being configured to individually ascertaining the distances between the position mark marking units and the object marking unit with identification of the position mark marking unit respectively measured.

13. The device as claimed in claim 11, further comprising
a determination component configured to determine an impulse response function indicating an impulse response of a dynamic system formed by motion of the object; and
wherein the determination component is further configured to use the impulse response function as a kernel function $k(t, t')$ for determining the motion curve.

14. The device as claimed in claim 11, further comprising
a regularization term forming unit configured to form the regularization term from a vector product of the coefficient vectors with a Gram matrix of the kernel functions.

15. The device as claimed in claim 11, further comprising
an estimating unit configured to estimate positions $\{p_1, \ldots, p_k\} \in \Re^3$ of the position marks and the coefficient vectors $\{\alpha_1, \ldots, \alpha_n\} \in \Re^3$ by minimizing a regularized risk functional, which, when using Cartesian coordinates, are represented by $$R_{reg}(\alpha^n, p^k) = \frac{1}{n}\sum_{i=1}^{n}(\|x_i - p_{a_i}\| - r_i)^2 + \mu\left(\alpha_x^{n^T} K \alpha_x^n + \alpha_y^{n^T} K \alpha_y^n + \alpha_z^{n^T} K \alpha_z^n\right)$$

where $$x_i = x(t_i) = \sum_{j=1}^{n} \alpha_j k(t_i, t_j)$$

where
K represents the Gram matrix $$K = \begin{bmatrix} k(t_1, t_1) & \ldots & k(t_1, t_n) \\ \vdots & \ddots & \vdots \\ k(t_n, t_1) & \ldots & k(t_n, t_n) \end{bmatrix};$$

$\alpha_x^n$, $\alpha_y^n$ and $\alpha_z^n$ represents x, y, and z coordinates of the coefficient vectors where $\alpha_x^n = (\alpha_1^x, \ldots, \alpha_n^x)^T$, $\alpha_y^n = (\alpha_1^y, \ldots, \alpha_n^y)^T$, and $\alpha^n = (\alpha_1, \ldots, \alpha_n)$ where $\alpha_1 = (\alpha_1^x \alpha_1^y \alpha_1^z)$, $\alpha_2 = (\alpha_2^x \alpha_2^y \alpha_2^z)$, ..., $\alpha_n = (\alpha_n^x \alpha_n^y \alpha_n^z)$;

$p^k$ represents a vector which contains the positions $\{p_1, \ldots, p_k\} \in \Re^3$ of the position marks represented in a form $p^k = (p_1^x, p_1^y, p_1^z, \ldots, p_k^x, p_k^y, p_k^z)^T$; and
μ represents a scalar parameter to be adapted to the object by empirical determination, and serving for weighting between the regularization term ($\alpha_x^{n^T} K\alpha_x^n + \alpha_y^{n^T} K\alpha_y^n + \alpha_z^{n^T} K\alpha_z^n$) and a cost function $$\frac{1}{n}\sum_{i=1}^{n}(\|x_i - p_{a_i}\| - r_i)^2.$$

16. The device as claimed in claim 11, further comprising
a marking unit configured to provide the position marks comprises using stationary transmitters or transceivers as position marks; and
the measuring unit is further configured to determine the distance between a respective transmitter or transceiver and a receiver or transceiver concomitantly moving with the object.

17. The device as claimed in claim 11, further comprising
a locating unit configured to locate the object on a map based on the distance values.

18. The device as claimed in claim 11, wherein
the unknown environment includes an unknown terrain or building; and
the device further comprises a locating unit configure to locate the object in the unknown terrain or building based on the distance values.

19. The device as claimed in claim 11, wherein
the positively defined kernel function is based on the following Gaussian function $$k(t, t') = \exp\left(-\frac{\|t - t'\|^2}{2\sigma^2}\right)$$

wherein t represents time and σ represents standard deviation.

20. The device as claimed in claim 19, further comprising
a selection component configured to select the standard deviation σ in accordance with a dynamic range of the object such that a first value of the standard deviation σ is selected when the object has motion that changes more rapidly with regard to at least one of magnitude and direction and a second value of the standard deviation σ, smaller than the first value of the standard deviation σ, is selected when the object has motion that changes more slowly with regard to at least one of magnitude and direction.

* * * * *